(12) United States Patent
Kim

(10) Patent No.: US 8,451,486 B2
(45) Date of Patent: May 28, 2013

(54) IMAGE FORMING APPARATUS HAVING DUPLEX AUTOMATIC DOCUMENT FEEDING (DADF) FUNCTION AND CONTROL METHOD THEREOF

(75) Inventor: Jeong-sang Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1252 days.

(21) Appl. No.: 12/256,621

(22) Filed: Oct. 23, 2008

(65) Prior Publication Data

US 2009/0168093 A1    Jul. 2, 2009

(30) Foreign Application Priority Data

Dec. 28, 2007   (KR) .................. 10-2007-0140767

(51) Int. Cl.
| | | |
|---|---|---|
| *G06K 15/00* | (2006.01) | |
| *H04N 1/04* | (2006.01) | |
| *G03G 15/22* | (2006.01) | |
| *G03G 15/23* | (2006.01) | |

(52) U.S. Cl.
USPC .......... 358/1.16; 358/474; 358/498; 399/306; 399/309

(58) Field of Classification Search
None
See application file for complete search history.

(56) References Cited

U.S. PATENT DOCUMENTS 5,734,482 A * 3/1998 Miyamoto et al. ............ 358/444

FOREIGN PATENT DOCUMENTS

| JP | 05-207218 | 8/1993 |
|---|---|---|
| JP | 2001-103254 | 4/2001 |

* cited by examiner

*Primary Examiner* — Thomas Lett
(74) *Attorney, Agent, or Firm* — Staas & Halsey LLP

(57) ABSTRACT

An image forming apparatus having a duplex automatic document feeding (DADF) function, and a control method thereof includes a DADF unit to feed a document along a duplex path, an image scanning unit to scan the document and output scan data, a storage unit to temporarily store the output scan data, and a controller to control the DADF unit to re-scan a first side of the document using the duplex path, if a full memory error occurs while the first side of the document is scanned.

26 Claims, 9 Drawing Sheets

FIG. 4

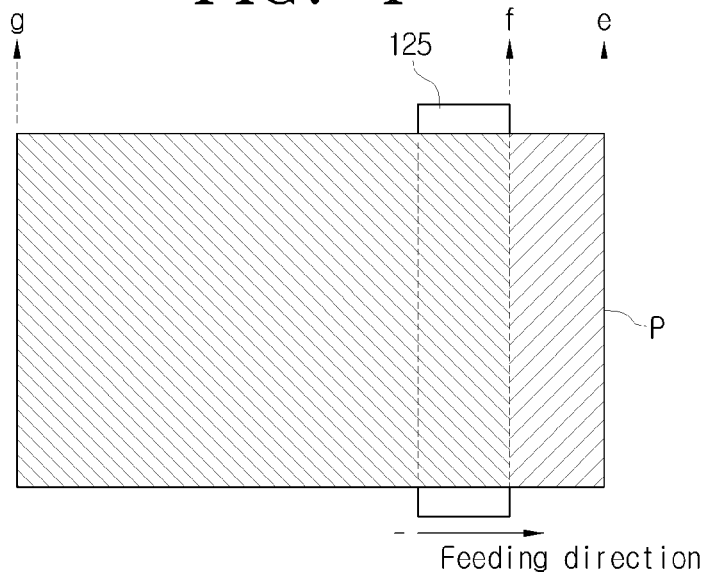

Feeding direction

FIG. 5A

Set re-scanning mode in simplex scanning

⦿ First mode : From a page at which full memory error occurs
◯ Second mode: From a second document
◯ Third mode : From a position where full memory error occurs

OK    CANCEL

FIG. 5B

Set re-scanning mode in duplex scanning

⦿ First mode : From a page at which full memory error occurs
◯ Second mode: From a second document
◯ Third mode : From a position where full memory error occurs
◯ Fourth mode: From a second side of the document

OK    CANCEL

IMAGE FORMING APPARATUS HAVING DUPLEX AUTOMATIC DOCUMENT FEEDING (DADF) FUNCTION AND CONTROL METHOD THEREOF

CROSS-REFERENCE TO RELATED APPLICATION

This application claims the benefit of Korean Application No. 2007-140767, filed Dec. 28, 2007, in the Korean Intellectual Property Office, the disclosure of which is incorporated herein by reference.

BACKGROUND OF THE INVENTION

1. Field of the Invention

Aspects of the present invention relate to an image forming apparatus having a duplex automatic document feeding (DADF) function and a control method thereof, and more particularly, to an image forming apparatus having a duplex automatic document feeding (DADF) function in order to automatically re-scan a document through a duplex path thereof, and a control method thereof.

2. Description of the Related Art

An automatic document feeding (ADF) device, when used for copying a plurality of document sheets, for example, enables continuous feeding of the plurality of document sheets one by one and copying of the fed sheets. Image forming apparatuses having such a duplex ADF (DADF) device have become widespread, enabling duplex copying and scanning operations.

When a user desires to copy a document, a conventional image forming apparatus having a DADF device feeds a document, scans the fed document, reads image data from the scanned document, and temporarily stores the read image data in a buffer. The temporarily stored image data is moved to another memory and converted into printable data. During a scanning operation of the document, if the buffer becomes full, the conventional image forming apparatus deletes image data stored in the buffer, and scans the following document, namely, another page. Alternatively, the conventional image forming apparatus stops driving a motor for copying, waits until image data can be stored in the buffer, and then re-scans the document.

However, when the conventional image forming apparatus deletes the image data, as described above, a user needs to manually place the document on a feeding path to scan the document whose image data has been deleted, which causes user inconvenience. Additionally, re-scanning the document from a portion where the buffer becomes full after stopping the motor causes an image quality to be reduced due to, for example, jitter. In particular, when scanning a document at a high speed, it is difficult to control the jitter, causing a large decrease in the image quality.

SUMMARY OF THE INVENTION

Aspects of the present invention relate to an image forming apparatus having a duplex automatic document feeding (DADF) function, which is able to re-scan a document at high speed while preventing degradation in the image quality when a full memory error occurs during a scanning operation of the document, and a control method thereof.

According to an aspect of the present invention, an image forming apparatus having a duplex automatic document feeding (DADF) function includes: a DADF unit to feed a document along a duplex path of the DADF unit; an image scanning unit to scan the document and output scan data; a storage unit to temporarily store the output scan data; and a controller to control the DADF unit to re-scan a first side of the document using the duplex path, if a full memory error occurs while the first side of the document is scanned.

According to an aspect of the present invention, the DADF unit includes a feeding portion to pick up the document and feed the picked up document; the duplex path used to change a feeding path of the document and feed the document back to the image scanning unit so that a second side of the document is scanned; and a discharge roller to discharge the document. If the full memory error occurs while the first side of the document is scanned, the duplex path is used to change the feeding path of the document so that the first side of the document is re-scanned by the image scanning unit.

According to an aspect of the present invention, the duplex path is used to change the feeding path of the document at least twice so as to cause the first side of the document to face the image scanning unit.

According to an aspect of the present invention, modes to re-scan the first side of the document include a first mode wherein the first side of the document is re-scanned from a page at which the full memory error occurs, a second mode wherein a second document is scanned prior to re-scanning a first document among a plurality of documents, a third mode wherein the first side of the document is re-scanned using a backup, and a fourth mode wherein the second side of the document is scanned prior to re-scanning the first side of the document. The controller causes the first side of the document to be re-scanned in a mode set from among the first to fourth modes based on a selection by a user.

According to an aspect of the present invention, if the first mode is set, the DADF unit re-scans the first side of the document using the duplex path.

According to an aspect of the present invention, if the second mode is set when there are a plurality of document sheets to be scanned, and if the full memory error occurs while the first side of the first document is scanned, the controller controls the DADF unit to scan the second document while the feeding path of the first document is changed, and to re-scan the first side of the first document.

According to an aspect of the present invention, the image forming apparatus further includes a memory to store the backup to back up the temporarily stored scan data, if the third mode is set. The controller controls the DADF unit to re-scan the document from a position on the first side of the document at which the full memory error occurs.

According to an aspect of the present invention, if the fourth mode is set, the DADF unit scans the second side of the document using the duplex path, and then re-scans the first side of the document.

According to an aspect of the present invention, the image forming apparatus further includes a display unit to display a graphical user interface (GUI) through which the user is able to select at least one from among the first to third modes, if a simplex scan mode of the image forming apparatus is actuated.

According to an aspect of the present invention, the image forming apparatus further includes a display unit to display a GUI through which the user is able to select at least one from among the first to fourth modes, if a duplex scan mode of the image forming apparatus is actuated.

According to another aspect of the present invention, there is provided a control method of an image forming apparatus, the method including feeding a document along a duplex path; scanning the document and outputting scan data; temporarily storing the output scan data; and if a full memory error occurs while a first side of the document is scanned, re-scanning the first side of the document using the duplex path.

According to another aspect of the present invention, the duplex path includes a first path along which a picked-up document is fed, a second path whereto a feeding path of the document is changed so that both sides of the document are scanned, and a third path along which the document is discharged. If the full memory error occurs, the feeding path of the document is changed using the second path so that the first side of the document is re-scanned.

According to another aspect of the present invention, the scanning includes re-scanning the first side of the document in a mode set from among a first mode wherein the first side of the document is re-scanned from a page at which the full memory error occurs, a second mode wherein a second document is scanned prior to re-scanning a first document among a plurality of documents, a third mode wherein the first side of the document is re-scanned using a backup, and a fourth mode wherein the second side of the document is scanned prior to re-scanning the first side of the document.

According to another aspect of the present invention, if the first mode is set, the re-scanning includes re-scanning the first side of the document using the duplex path.

According to another aspect of the present invention, if the second mode is set when there are a plurality of document sheets to be scanned, the re-scanning includes scanning the second document while the feeding path of the first document is changed using the duplex path, and re-scanning the first side of the first document.

According to another aspect of the present invention, if the third mode is set, the re-scanning includes backing up the scan data and re-scanning the first side of the document from a position on the first side of the document at which the full memory error occurs.

According to another aspect of the present invention, if the fourth mode is set, the re-scanning includes scanning the second side of the document using the duplex path, and then re-scanning the first side of the document.

According to another aspect of the present invention, the method further includes, if a simplex scan mode of the image forming apparatus is actuated, displaying a graphical user interface (GUI) through which a user is able to select at least one from among the first to third modes; and if the re-scanning is performed, displaying a message to notify that the document is being re-scanned in a mode selected from among the first to third modes.

According to another aspect of the present invention, the method further includes, if a duplex scan mode of the image forming apparatus is actuated, displaying a GUI through which a user is able to select at least one from among the first to fourth modes; and if the re-scanning is performed, displaying a message to notify that the document is being re-scanned in a mode selected from among the first to fourth modes.

According to another aspect of the present invention, a request for a scanning operation for reading the scan data is received from a plurality of hosts connected to the image forming apparatus via a network.

According to another aspect of the present invention An image forming apparatus able to scan one or both sides of a document via a duplex automatic document feeding (DADF) function, including: a DADF unit having a simplex path to enable scan of a first side of the document and a duplex path to enable scan of the first side and a second side of the document; an image scanning unit to scan the first side and the second side of the document and output corresponding scan data; a storage unit to temporarily store some or all of the corresponding scan data; and a controller to control the DADF unit to transport the document through the duplex path more than one time to face the first side of the document or the second side of the document to the image scanning unit to re-scan the respective first side of the document or the second side of the document if a full memory error occurs in the storage unit while the respective first side of the document or the second side of the document is being scanned.

According to another aspect of the present invention, a method of controlling an image forming apparatus to scan one or both sides of a document via a duplex automatic document feeding (DADF) function via a simplex path to enable scan of a first side of the document and a duplex path to enable scan of the first side and a second side of the document, includes: scanning the first side of the document or the second side of the document; and transporting the document through the duplex path more than one time to re-scan the respective first side of the document or the second side of the document if a full memory error occurs in the image forming apparatus while the respective first side of the document or the second side of the document is being scanned.

According to another aspect of the present invention, an image forming apparatus having a duplex automatic document feeding (DADF) function able to scan one or both sides of a document includes: a DADF unit to perform scanning operations at high speeds and having a simplex operation to scan a first side of the document and a duplex operation to scan the first side and a second side of the document; an image scanning unit to scan the first side and the second side of the document and output corresponding scan data; a storage unit to temporarily store some or all of the corresponding scan data; and a controller to control the DADF unit to perform a sorting operation to re-scan the first side and/or second side of the document if a full memory error occurs in the storage unit while the respective first side of the document or the second side of the document is being scanned.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the aspects, taken in conjunction with the accompanying drawings of which:

FIG. 4 is a view illustrating a third scanning mode of a DADF unit of an image forming apparatus according to an aspect of the present invention;

FIG. 5A is a view illustrating an example of a graphical user interface (GUI) in order to select one from among first to third modes during a simplex scanning operation;

FIG. 5B is a view illustrating an example of a GUI in order to select one from among first to fourth modes during a duplex scanning operation;

DETAILED DESCRIPTION OF THE EMBODIMENTS

Figure 1:
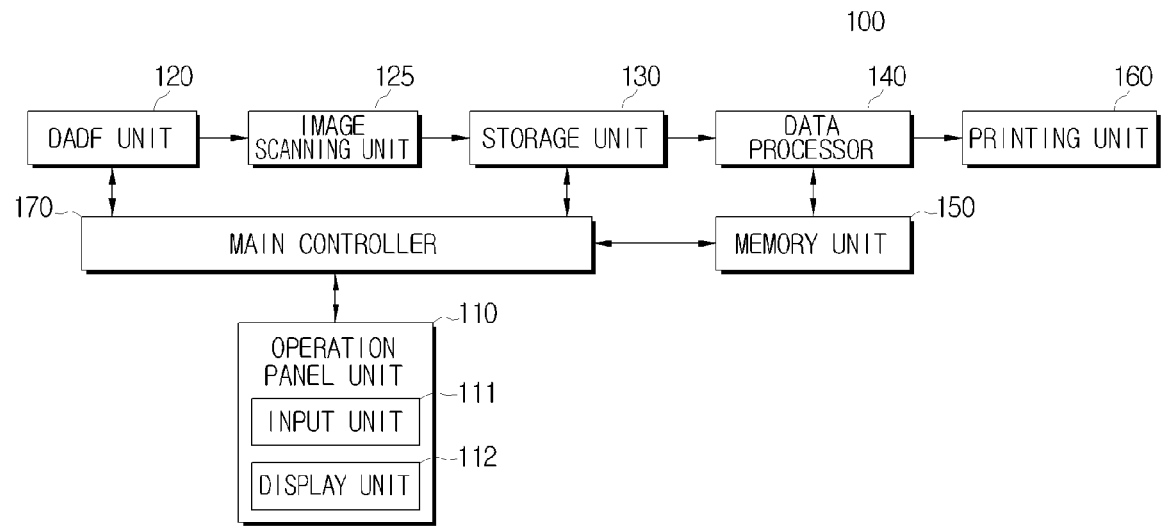
FIG. 1 is a block diagram of an image forming apparatus having a duplex automatic document feeding (DADF) function according to an aspect of the present invention.

Reference will now be made in detail to aspects of the present invention, examples of which are illustrated in the accompanying drawings, wherein like reference numerals refer to the like elements throughout. The aspects are described below in order to explain the present invention by referring to the figures.

FIG. 1 is a block diagram of an image forming apparatus 100 having a duplex automatic document feeding (DADF) function according to an aspect of the present invention. The image forming apparatus 100 of FIG. 1 includes an operation panel unit 110, a DADF unit 120, an image scanning unit 125, a storage unit 130, a data processor 140, a memory unit 150, a printing unit 160, and a main controller 170.

The image forming apparatus 100 has a DADF function, and is able to perform at least one of copying, scanning, facsimile transmission, printing, and e-mail transmission functions. The image forming apparatus 100 is able to communicate with an external host, such as a personal computer (PC), connected via wired or wireless networks, and accordingly, the image forming apparatus 100 performs tasks requested from the external host.

The operation panel unit 110 includes an input unit 111 and a display unit 112. The input unit 111 receives input signals, which are based on user inputs that are input using a plurality of manipulation buttons or a touch panel, for example, and outputs the received input signals to the main controller 170. The display unit 112 displays a current operating status of the image forming apparatus 100 and a user interface screen. In particular, the operation panel unit 110 provides a graphical user interface (GUI), as illustrated in FIG. 5A or FIG. 5B, through which a user may set a desired mode from among first to fourth modes or may set a priority order of the first to fourth modes of the DADF function. The first to fourth modes will be described below.

Figure 2A:
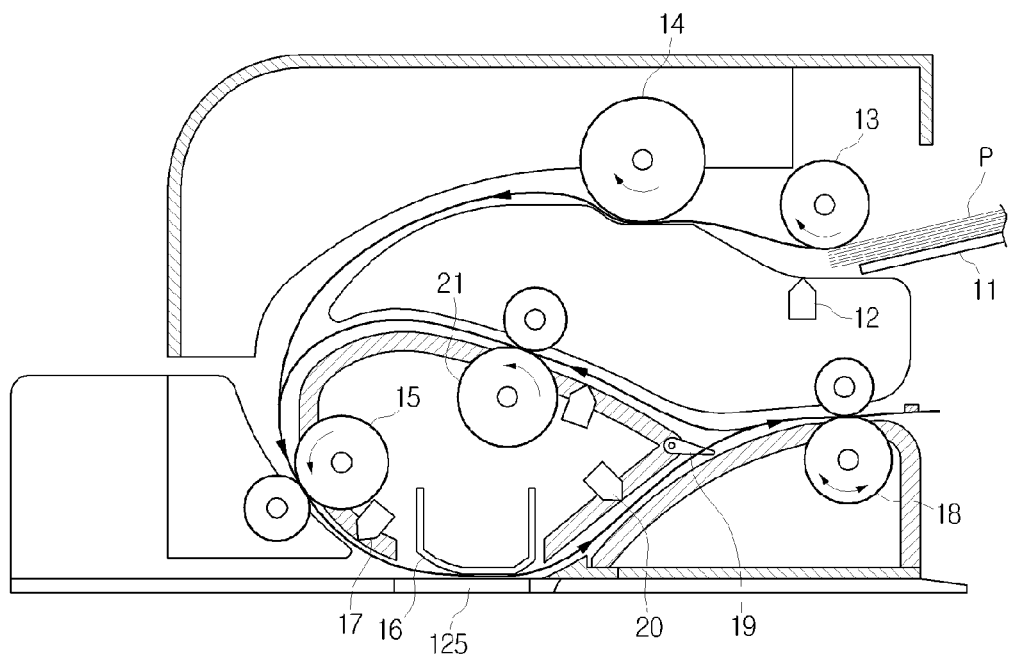
FIGS. 2A and 2B are schematic views illustrating an example of a DADF unit of an image forming apparatus according to an aspect of the present invention.
Figure 2B:
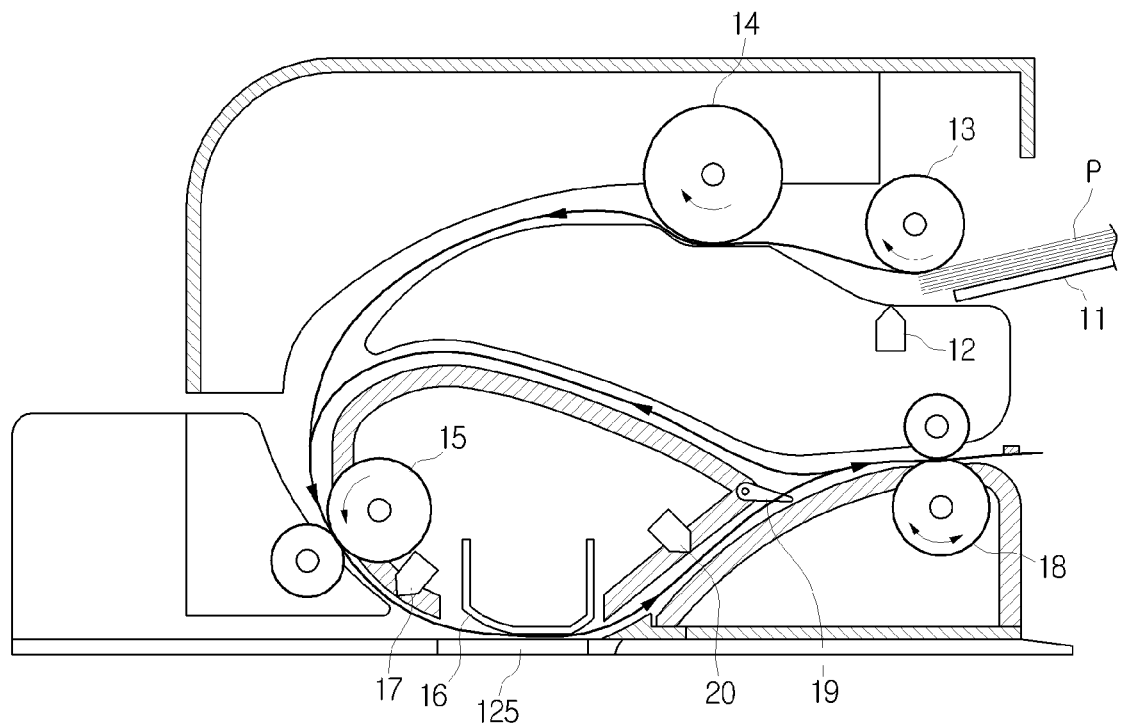
Figure 3:
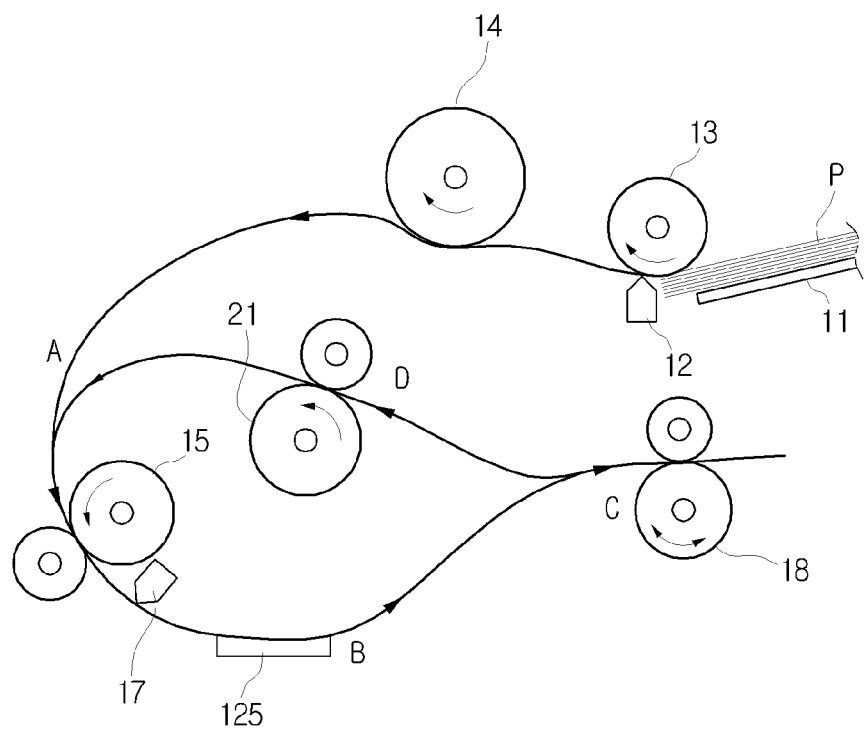
FIG. 3 is a schematic view illustrating a document feeding path in the DADF unit of FIG. 2A.

The DADF unit 120 has a duplex path to scan a single side or both sides of a document. FIGS. 2A and 2B schematically illustrate an example of the DADF unit 120, and FIG. 3 schematically illustrates a document feeding path in the DADF unit 120 of FIGS. 2A and 2B. Although not illustrated in the drawings for convenience of description, one or more driving motors are used to drive the DADF unit 120.

Referring to FIGS. 2A to 3, the DADF unit 120 includes feeding portions A and B, a discharge portion C, and a duplex path portion D. The feeding portions A and B pick up a document P and feed the document P, and includes a pickup roller 13, an automatic document feeding (ADF) roller 14, and a feeding roller 15. The discharge portion C includes a discharge roller 18 to discharge the document P externally.

The duplex path portion D changes a feeding path of the document P, one side of which has been scanned, and feeds the document P back to the image scanning unit 125 to scan the second side of the document P. The duplex path portion D includes a shutter 19, a sensor 20, and a DADF roller 21, but the DADF roller 21 may be omitted, as illustrated in FIG. 2B. In aspects of the present invention, a change of the feeding path results in a flip of the document P from a first side to a second side or vice versa.

Continuing with reference to FIGS. 2A to 3, simplex scanning operations in the DADF unit 120 will be described first. If a DADF sensor 12 detects and confirms that the document P is stacked in a tray 11, the pickup roller 13 picks up the document P stacked in the tray 11, and the ADF roller 14 separates the picked-up document P sheet by sheet and feeds the document P to the feeding roller 15.

The document P fed by the feeding roller 15 is pressed by a white bar 16 and passed through the image scanning unit 125. During this operation, the position of the leading end of the document P is controlled by a scanning sensor 17. The image scanning unit 125 scans a first side of the document P and outputs digital scan data. The image scanning unit 125 may include a sensor, such as a charge-coupled device (CCD), or others, but is not limited thereto. The scanned document P is discharged by the discharge roller 18. After a front side of the document P (with respect to a state of being stacked in the tray 11) is scanned, the front side (or the first side) of the document P faces down while the document P passes through the discharge roller 18. In summary, a simplex path during the simplex scanning operation as above can be represented by reference to FIG. 3 as A→B→C.

Referring to FIGS. 2A to 3, duplex scanning operations are performed as follows. The document P stacked in the tray 11 passes through the pickup roller 13, ADF roller 14, feeding roller 15 and image scanning unit 125 in the same manner as in the simplex scanning operation. The document P, one side of which has been scanned by the image scanning unit 125, passes through the shutter 19 and reaches the discharge roller 18. Since the trailing end of the document P is controlled by the sensor 20, the discharge roller 18 is reversed at a predetermined position and the document P is fed in an opposite direction. Here, the shutter 19 is rotated unidirectionally by a shaft. The document P being fed in reverse to the discharge roller 18 is fed back to the image scanning unit 125 past the shutter 19, DADF roller 21 and the feeding roller 15. The second side, that is, the rear side of the document P (with respect to a state being stacked in the tray 11) is similarly scanned by the image scanning unit 125, and then the document P is fed to the discharge roller 18. To summarize, for the duplex scanning operation, the document P passes through a duplex path by reference to FIG. 3 as A→B→C→D→B→C.

Referring back to FIG. 1, the storage unit 130 temporarily stores scan data output from the image scanning unit 125, and outputs the temporarily stored scan data to the data processor 140 under control of the main controller 170. The data processor 140 compresses the scan data, and the memory unit 150 then stores the compressed scan data. Here, the memory unit 150 may be a hard disc drive (HDD), or other types of memory, including flash and/or DRAM memory. The scan data may be stored in the memory unit 150 for a long period of time, or may be decompressed by the data processor 140, converted into data suitable for printing by the printing unit 160, and be printed.

The main controller 170 controls the entire operation of the image forming apparatus 100 using various programs or instructions stored in a read only memory (ROM, not illustrated), for example. For example, the main controller 170 controls the image scanning unit 125 and storage unit 130 to scan the document P, to output scan data, and to temporarily store the output scan data. Additionally, the main controller 170 controls the data processor 140 and the memory unit 150 to compress the temporarily stored scan data and to store the compressed scan data. The main controller 170 also controls the data processor 140 and printing unit 160 to decompress the compressed scan data and to print the decompressed scan data.

The scan data is temporarily stored in the storage unit 130 prior to compression, and thus, has a large capacity. Accordingly, if the scan data is accumulated by a delay in compression of the scan data due to loads occurring in the data processor 140, or if the scan data is not transmitted to the data processor 140 due to loads occurring in the memory unit 150 or in the main controller 170, the storage unit 130 may become full, so that a full memory error may occur.

If the full memory error occurs in the storage unit 130 while a first side of the document P is being scanned in a simplex scan mode or a duplex scan mode of the image forming apparatus 100, the main controller 170 deletes the scan data temporarily stored in the storage unit 130. Additionally, the main controller 170 controls the DADF unit 120 so that the document P is able to be re-scanned through the duplex path portion D in the DADF unit 120. When the full memory error occurs, first to fourth modes of the DADF function are provided to re-scan the first side of the document P.

The first mode to re-scan the first side of the document P from a page at which the full memory error occurs, will be described first. If the full memory error occurs during scanning of the first side of the document P, the main controller 170 deletes scan data of the first side that was scanned before an occurrence of the full memory error from among the scan data stored in the storage unit 130 and memory unit 150. Additionally, the main controller 170 controls the feeding portions A and B so that the document P is fed to the image scanning unit 125 through the duplex path portion D, rather than being discharged to the discharge roller 18. Accordingly, the document P is sorted through the duplex path portion D according to the control of the main controller 170. Here, document sorting refers to changing the feeding path of the document P so that the first side of the document P where the full memory error occurs is scanned.

For example, during document sorting, the feeding path of the document P is changed in such a manner that the first side of the document P faces the image scanning unit 125. The duplex path portion D causes the document P to be fed to the image scanning unit 125 through the shutter 19 and the DADF roller 21 along a path represented as B→C→D→B in FIG. 3. In this situation, the first side of the document P faces the white bar 16 instead of the image scanning unit 125, so the document P is fed back again along the path represented as C→D→B in FIG. 3 so that a first side of the document P will face the scanning unit 125. Accordingly, the document P is sorted so that the first side of the document P faces the image scanning unit 125 to be scanned, and that the scan data is temporarily stored in the storage unit 130.

The second mode to scan a second document before scanning a current document P when there are a plurality of document sheets to be scanned will be described below. The second document refers to a document to be scanned after scanning of the current document P in an order corresponding to the stacking order of the plurality of document sheets in the tray 11. If the full memory error occurs while the image scanning unit 125 scans the first side of the current document P, the main controller 170 deletes the scan data stored in the storage unit 130 and memory unit 150, and controls the DADF unit 120 and image scanning unit 125 to scan the second document first, and then to re-scan the first side of the first document P.

In more detail, the main controller 170 controls the duplex path portion D to sort the first document P, and controls the DADF unit 120 so that the second document is to be scanned while the first document P is sorted along a path represented as A→B→C→D→B in FIG. 3. After the second document has been scanned, the main controller 170 causes the first document P to be re-sorted so that the first side of the first document P is to be re-scanned. Here, the duplex path portion D requires a space for the first document P to enter during scanning of the second document, in order to prevent errors from occurring due to an overlap between the first document P and the second document.

Subsequently, the main controller 170 changes the storage order of scan data stored in the memory unit 150 so that the scan data of the first document P takes precedence in the storage order over scan data of the second document. Accordingly, the main controller 170 stores the scan data in the memory unit 150 in an order corresponding to the stacking order of the plurality of document sheets in the tray 11.

To summarize, in the second mode, when the first document P is fed to the image scanning unit 125 through the shutter 19 and DADF roller 21 along a path represented as B→C→D in FIG. 3, the second document is scanned along a path represented as A→B→C in FIG. 3, and the first document P is fed back along the path represented as B→C→D→B in FIG. 3 once more in order to sort the first document P.

The third mode to re-scan the first side of the document P using a backup will be described below. In the third mode, when the scan data is stored in the memory unit 150 through the storage unit 130 and data processor 140, the compressed scan data stored in the memory unit 150 is retained as a backup rather than being deleted, and the first side of the document P is re-scanned from a position on the first side of the document P at which the full memory error occurs.

In more detail, when the full memory error occurs at a position f on the first side of the document P while the image scanning unit 125 scans the first side of the document P, as illustrated in FIG. 4, the main controller 170 memorizes the position f. The main controller 170 then deletes the scan data temporarily stored in the storage unit 130 corresponding to an area between positions e (a leading end of the document P) and f as indicated by downward-sloping diagonal lines in FIG. 4, rather than deleting the compressed scan data stored in the memory unit 150 corresponding to an area between positions e and f. While sorting the document P so that the first side of the document P faces the image scanning unit 125, the main controller 170 controls the DADF unit 120 to feed the document P to the image scanning unit 125 from the position f, as illustrated in FIG. 4. Accordingly, the image scanning unit 125 scans an area, as indicated by upward-sloping diagonal lines in FIG. 4, between positions f and g (a trailing end of the document P) on the first side of the document P. Here, the main controller 170 may sort sheets of the document P to the position f at a greater speed than the actual scanning speed, so the re-scanning operation can be performed more rapidly.

The fourth mode to scan a second side of the document P before scanning the first side of the document P during the duplex scanning operation will be described below. When the full memory error occurs while the first side of the document P is being scanned, the main controller 170 deletes the corresponding scan data stored in the storage unit 130 and memory unit 150. The main controller 170 then causes the document P to be fed to the image scanning unit 125 through the duplex path portion D so that the second side of the document P is to be scanned first by the scanning unit 125. Once the second side of the document P is scanned, the main controller 170 controls the DADF unit 120 and image scanning unit 125 so that the document P is sorted along the path represented as B→C→D→B illustrated in FIG. 3 so that the first side of the document P is re-scanned.

The image forming apparatus 100 is operated in a mode set by a user or by default from among the first to fourth modes. Simplex scanning operation causes only a single side of a document to be scanned, so it is impossible to perform the simplex scanning operation in the fourth mode, but the first to third modes can be actuated during both simplex and duplex scanning operations. Therefore, during the simplex scanning operation, the main controller 170 generates a GUI through which a user selects one from among the first to third modes and displays the generated GUI on the display unit 112, as illustrated in FIG. 5A. Alternatively, during duplex scanning operation, the main controller 170 generates a GUI through which a user selects one from among the first to fourth modes and displays the generated GUI on the display unit 112, as illustrated in FIG. 5B.

The main controller 170 stores a mode selected by the user in a register, a separate flash ROM and the memory unit 150, and causes the document P to be re-scanned in the selected mode during the memory full state of the storage unit 130. Alternatively, a certain mode is preset as a default mode when designing programs required to perform the above-described operations. Accordingly, if the user does not select any of the modes through the displayed GUIs, the main controller 170 is operated in a previously set default mode. Additionally, if scanning is required and/or if errors such as a full memory error occur, the main controller 170 may cause the GUIs illustrated in FIGS. 5A and 5B to be displayed randomly.

If the full memory error occurs, the main controller 170 generates a message notifying that the document P is currently being re-scanned in a mode set from among the first to fourth modes, and displays the generated message on the display unit 112. Therefore, the user can be notified of the current operating status or mode of the image forming apparatus 100 through the GUIs and messages displayed on the display unit 112.

Figure 6:
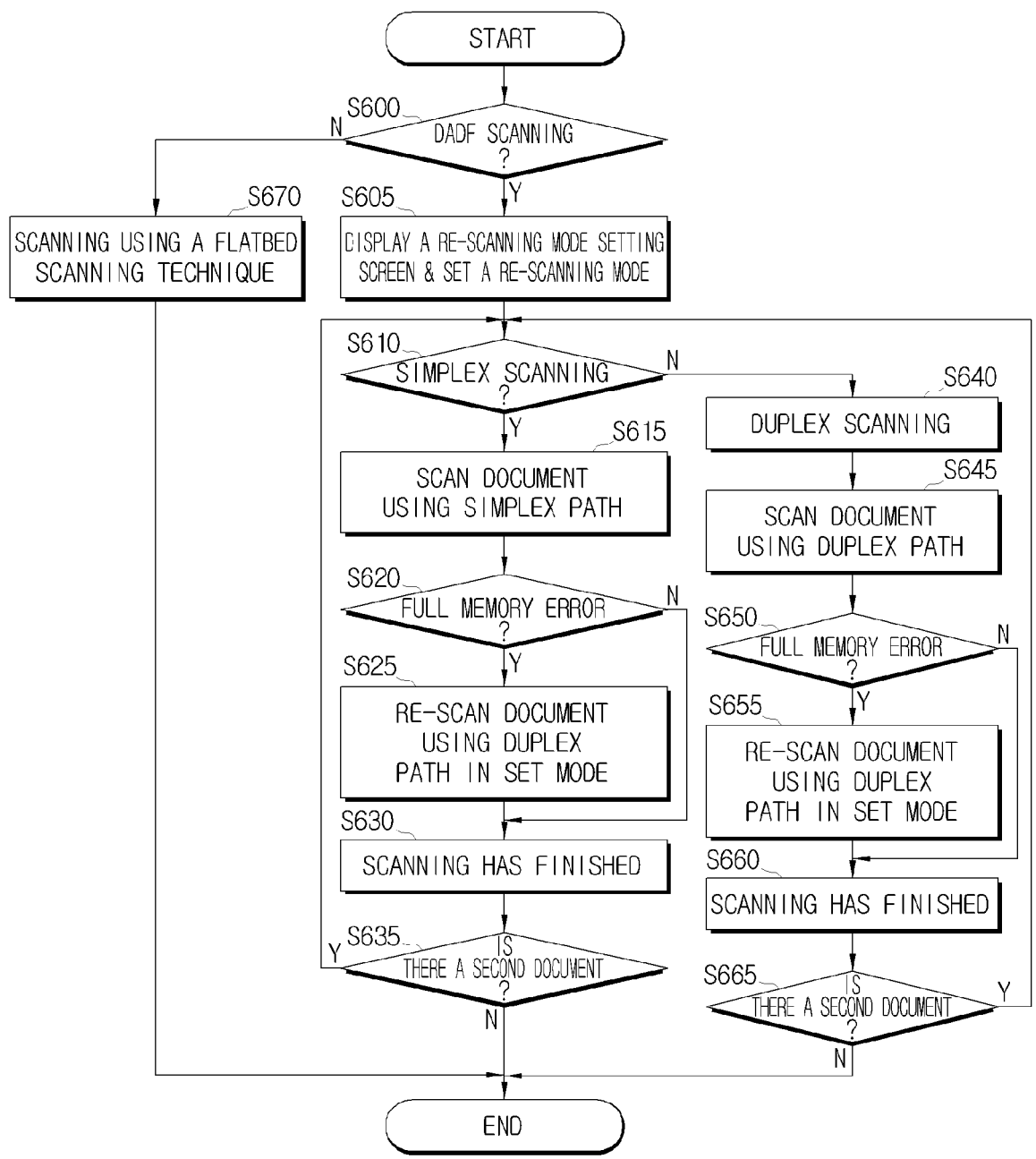
FIG. 6 is a flowchart explaining a method of controlling the image forming apparatus of FIG. 1.

FIG. 6 is a flowchart explaining a method of controlling the image forming apparatus 100 of FIG. 1. Referring to FIGS. 1 to 6, if a request for DADF scanning is received from the external host via the operation panel unit 110 or via the network (Y in operation S600), the main controller 170 displays a re-scanning mode setting screen through which the user is able to set a re-scanning mode(operation S605). During operation S600, the main controller 170 perceives that the request for DADF scanning is received, in response to a signal from the DADF sensor 12. Additionally, if the simplex scanning operation is requested (operation S610), the main controller 170 generates a GUI illustrated in FIG. 5A and display the generated GUI on the display unit 112, or alternatively, if the duplex scanning operation is requested, the main controller 170 generates a GUI illustrated in FIG. 5B and display the generated GUI on the display unit 112.

Specifically, if the simplex scanning operation is requested (operation S610), the main controller 170 controls the DADF unit 120 so that the first side of the document P is scanned along the simplex path represented as A→B→C in FIG. 3 (operation S615). During operation S615, according to the control of the main controller 170, the scan data output from the image scanning unit 125 is temporarily stored in the storage unit 130 and compressed by the data processor 140, and the compressed scan data is stored in the memory unit 150.

If the capacity of the storage unit 130 becomes full during operation S615, that is, if the full memory error occurs while the first side of the document P is being scanned (operation S620), the main controller 170 causes the first side of the document P to be re-scanned along the duplex path according to the re-scanning mode set in operation S605 (operation S625). Operation S625 will be described later with reference to FIGS. 7 to 9.

If the first side of the first document P has been completely re-scanned in the set scanning mode (operation S630), the main controller 170 determines whether the second document exists in the tray 11 (operation S635). If the second document is determined to exist, the main controller 170 re-performs the control process from operation S610 for the second document.

Alternatively, if the duplex scanning operation is requested (operation S640), the main controller 170 controls the DADF unit 120 so that both sides of the document P is scanned along the duplex path represented as A→B→C→D→B→C in FIG. 3 (operation S645).

During operation S645, if the full memory error occurs in the storage unit 130 while the first side of the document P is being scanned (Y in operation S650), the main controller 170 causes the first side of the document P to be re-scanned along the duplex path according to the re-scanning mode set in operation S605 (operation S655). Operation S655 will also be described later with reference to FIGS. 7 to 9.

If a first side of the document P is re-scanned, the main controller 170 controls the document P to be fed back to the image scanning unit 125 through the duplex path portion D, and controls the image scanning unit 125 to scan a second side of the document P so that both sides of the document P can be scanned (operation S660).

After operation S660, the main controller 170 determines whether the second document exists in the tray 11, in operation S665. If it is determined that the second document exists (Y in operation S665), the main controller 170 re-performs the control process from operation S610.

On the other hand, if it is determined that the request for DADF scanning is not received (N in operation S600), the main controller 170 controls the image scanning unit 125 to scan the document P using a flatbed scanning technique (operation S670).

Figure 7:
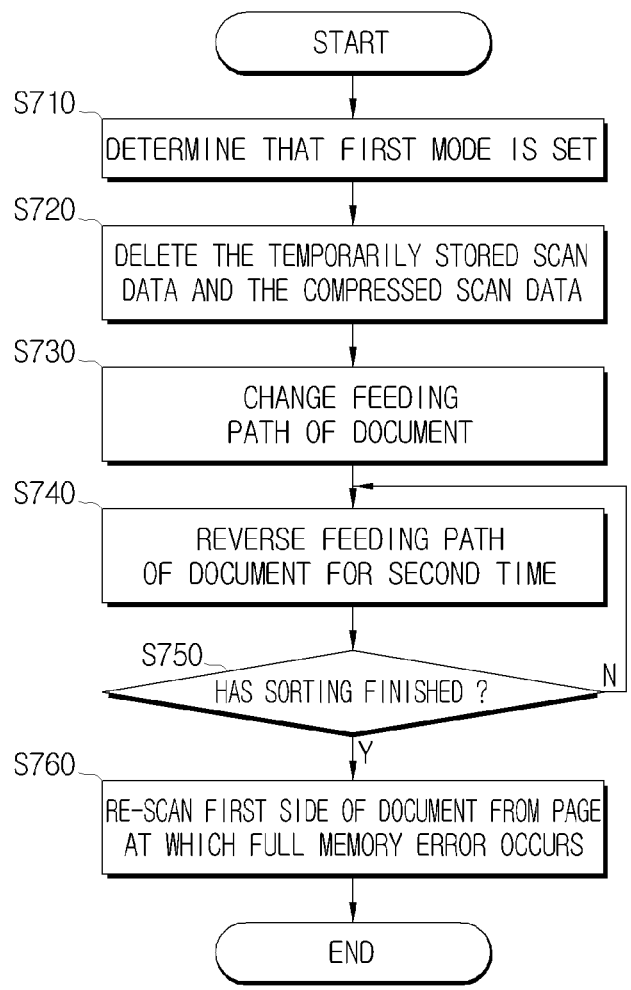
FIG. 7 is a flowchart explaining a re-scanning operation in the first mode from among the modes activated in operation S625 or S655 of FIG. 6.

FIG. 7 is a flowchart explaining the re-scanning operation in the first mode from among the modes activated in operation S625 or S655 of FIG. 6. Referring to FIGS. 1 to 7, if it is determined that the first mode is set in each of operation S625 or S655 (operation S710), the main controller 170 deletes the scan data temporarily stored in the storage unit 130 and the compressed scan data stored in the memory unit 150 (operation S720).

Since the full memory error occurs while a first side of the document P is being scanned, the main controller 170 controls the DADF unit 120 so that the first side of the document P is re-scanned. The main controller 170 controls the duplex path portion D to change the feeding path of the document P so that the document P is fed to the image scanning unit 125 rather than being discharged along the duplex path (operation S730). Accordingly, the document P is fed back to the image scanning unit 125 along the path represented as B→C→D→B in FIG. 3, and here, the first side of the document P faces the white bar 16.

Additionally, the main controller 170 controls the DADF unit 120 to reverse the feeding path of the document P for a second time along the duplex path in order to cause the first side of the document P to face the image scanning unit 125, that is, in order to sort the document P, (operation S740). Accordingly, the document P is fed back to the image scanning unit 125 along the path represented as B→C→D→B in FIG. 3, and here, the first side of the document P faces the image scanning unit 125.

If the document P has been completely sorted in operation S750, the main controller 170 controls the image scanning unit 125 to re-scan the first side of the document P from a page at which the full memory error occurs (operation S760). Data re-scanned in operation S760 is temporarily stored in the storage unit 130. If re-scanning of the document P has finished (operation S630, S660), the main controller 170 then determines whether the second document exists (operation S635 or S665).

Figure 8:
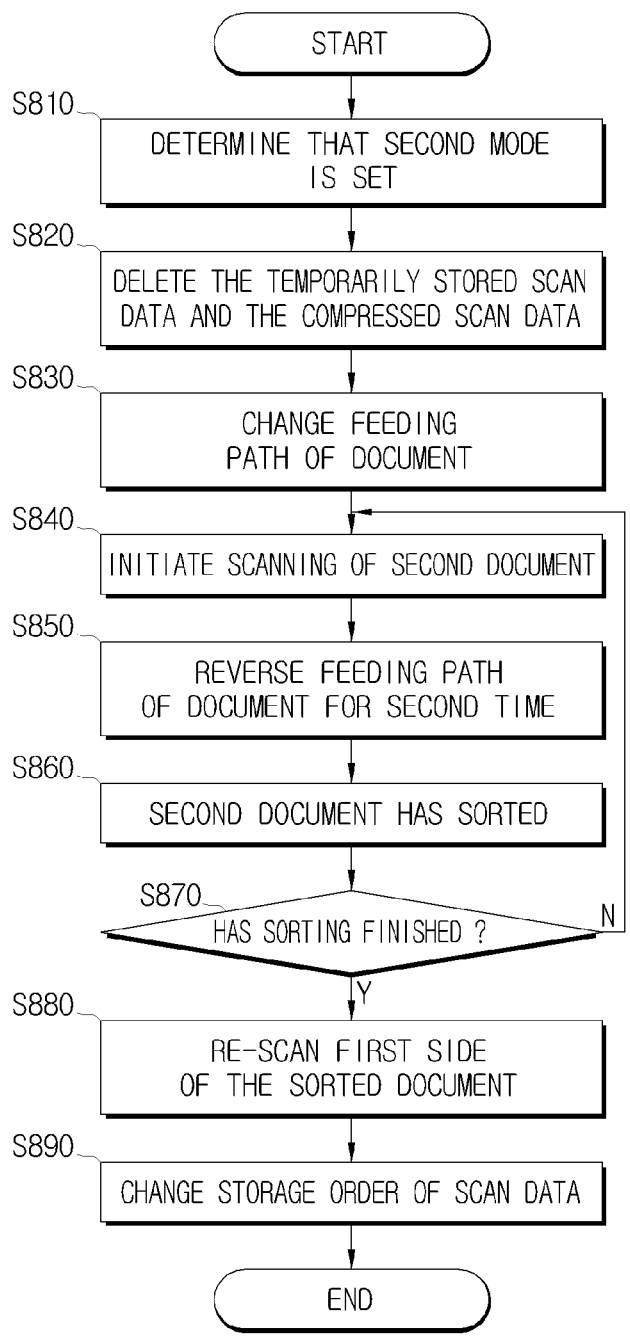
FIG. 8 is a flowchart explaining a re-scanning operation in the second mode from among the modes activated in operation S625 or S655 of FIG. 6.

FIG. 8 is a flowchart explaining the re-scanning operation in the second mode from among the modes activated in operation S625 or S655 of FIG. 6. Referring to FIGS. 1 to 8, if it is determined that the second mode is set as a result of operation S625 or S655 (operation S810), the main controller 170 deletes the scan data temporarily stored in the storage unit 130 and the compressed scan data stored in the memory unit 150 (operation S820). Since the full memory error occurs while a first side of the first document P is being scanned, the main controller 170 controls the duplex path portion D to reverse the feeding path of the document P so that the document P is fed back to the image scanning unit 125 along the duplex path (operation S830).

Additionally, the main controller 170 controls the DADF unit 120 to pick up the second document stacked in the tray 11 and to initiate scanning of the second document (operation S840). In order to arrange the first document P, the main controller 170 also controls the DADF unit 120 to reverse the feeding path of the document P for the second time (operation S850). In more detail, while the first document P is being fed back to the image scanning unit 125 along the path represented as B→C→D in FIG. 3, the DADF unit 120 picks up the second document and starts to scan the second document. Additionally, while the first document P is being fed back to the image scanning unit 125 by changing the feeding path of the document P for the second time to the path represented as B→C→D→B in FIG. 3, the image scanning unit 125 scans the second document. After the second document has been completely scanned, if scan data corresponding to the second document is compressed and if the compressed scan data is stored in the memory unit 150 (operation S860), the main controller 170 checks whether sorting has finished (operation S870).

If the first side of the first document P is disposed in a direction in which scanning is to be performed, the main controller 170 determines that sorting has finished (Y in operation S870), and controls the image scanning unit 125 to re-scan the first side of the first document P from a page at which the full memory error occurs (operation S880). Data re-scanned in operation S880 is temporarily stored in the storage unit 130 and the temporarily stored scan data is output to the data processor 140.

Additionally, if both the first side of the first document P and the second document have been scanned during operation S880, the main controller 170 changes the storage order of the scan data for the first side of the first document P and the scan data for the second document (operation S890). If re-scanning of the first document P has finished (operation S630, S660), the main controller 170 then determines whether the second document exists (operation S635 or S665).

Figure 9:
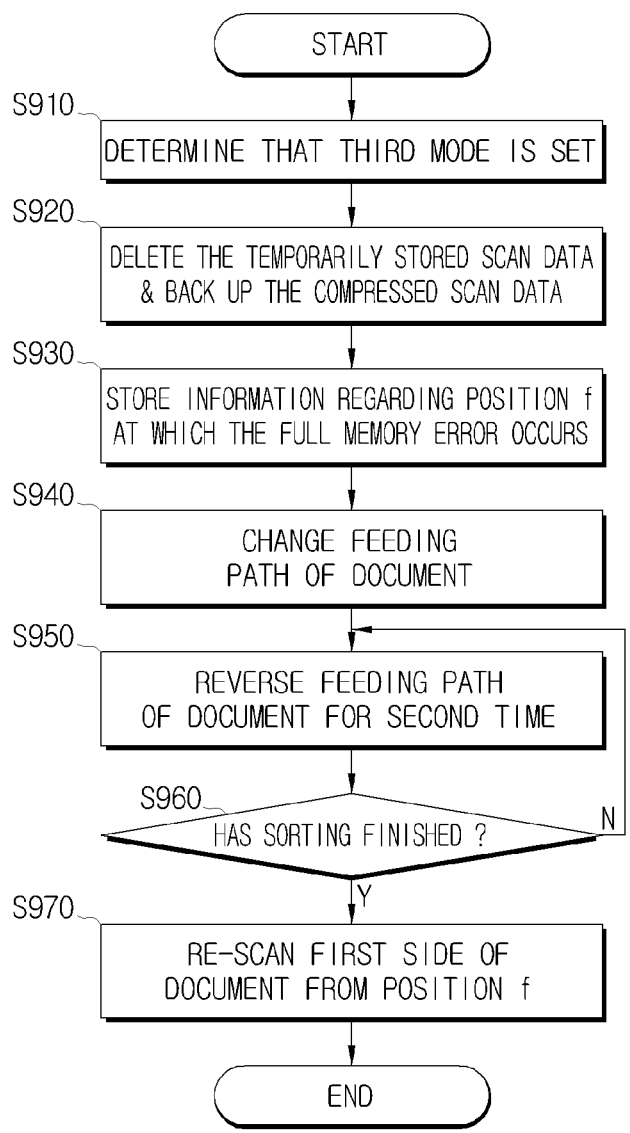
FIG. 9 is a flowchart explaining a re-scanning operation in the third mode from among the modes activated in operation S625 or S655 of FIG. 6.

FIG. 9 is a flowchart explaining the re-scanning operation in the third mode from among the modes activated in operation S625 or S655 of FIG. 6. Referring to FIGS. 1 to 9, if it is determined that the third mode is set as a result of operation S625 or S655 (operation S910), the main controller 170 deletes the scan data temporarily stored in the storage unit 130, and backs up the compressed scan data stored in the memory unit 150 (operation S920). In order words, the main controller 170 retains the compressed scan data in the memory unit 150 rather than deleting the data, and then performs backup processing.

The main controller 170 stores position information regarding a position on the first side of the document P, for example the position f of FIG. 4, at which the full memory error occurs, in the memory unit 150 or in a flash ROM (not illustrated) (operation S930). Subsequently, the main controller 170 controls the duplex path portion D to change the feeding path of the document P so that the document P is fed back to the image scanning unit 125 along the duplex path (operation S940).

Since it is impossible to scan a first side of the document P during operation S940, the main controller 170 again sorts the document P to the position at which the full memory error occurs (operation S950). In more detail, the main controller 170 controls the DADF unit 120 to reverse the feeding path of the document P for the second time so that the first side of the document P again faces the image scanning unit 125. As illustrated in FIG. 4, the main controller 170 ensures that the position f of the document P is located in the image scanning unit 125 so that scanning is performed from the position f by the image scanning unit 125.

If sorting of the document P has finished (Y in operation S960), the main controller 170 controls the image scanning unit 125 to scan the area between positions f and g on the document P (operation S970). The scan data obtained as a result of operation S970 is temporarily stored in the storage unit 130 and the temporarily stored scan data is output to the data processor 140. If re-scanning of the document P has finished (operation S630, S660), the main controller 170 then determines whether the second document exists (operation S635 or S665).

Figure 10:
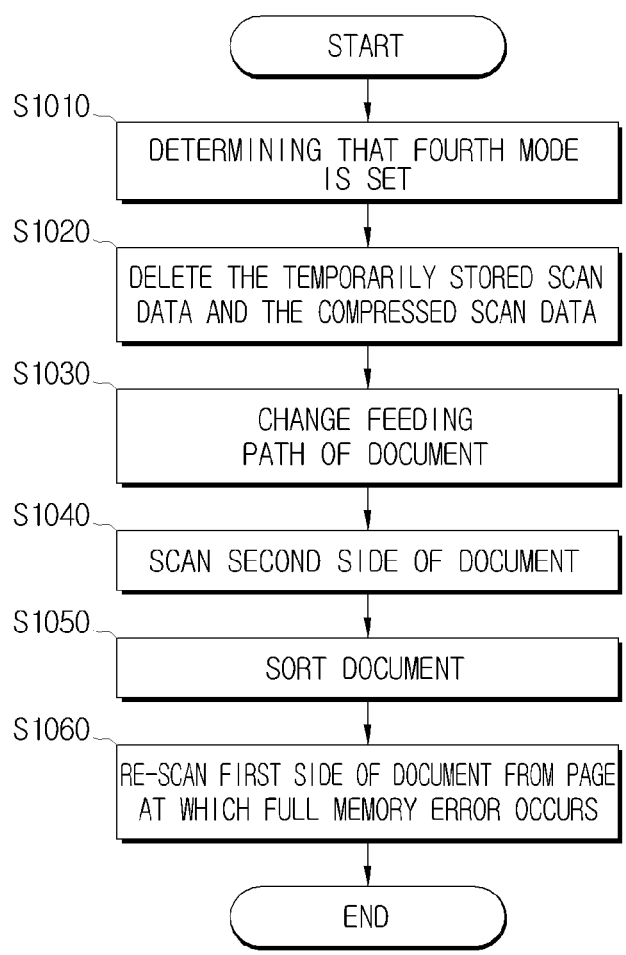
FIG. 10 is a flowchart explaining a re-scanning operation in the fourth mode from among the modes activated in operation S625 or S655 of FIG. 6.

FIG. 10 is a flowchart explaining the re-scanning operation in the fourth mode from among the modes activated in operation S625 or S655 of FIG. 6. Referring to FIGS. 1 to 6 and 10, if it is determined that the fourth mode is set as a result of operation S625 or S655 (operation S1010), the main controller 170 deletes the scan data temporarily stored in the storage unit 130 and the compressed scan data stored in the memory unit 150 (operation S1020).

The main controller 170 controls the duplex path portion D to feed the document P to the image scanning unit 125 (operation S1030). Specifically, the document P is fed back to the image scanning unit 125 along the path represented as B→C→D→B in FIG. 3, so that the second side of the document P faces the image scanning unit 125. The main controller 170 then controls the image scanning unit 125 to scan the second side of the document P, and causes the storage unit 130 to store scan data for the second side of the document P (operation S1040).

Subsequently, the main controller 170 controls the DADF unit 120 to sort the document P along the path represented as B→C→D→B in FIG. 3 so that the front side of the document P faces the image scanning unit 125 (operation S1 050). Additionally, the main controller 170 controls the image scanning unit 125 to re-scan the first side of the document P from a page at which the full memory error occurs (operation S1060). Image data re-scanned in operation S1060 is temporarily stored in the storage unit 130, and the temporarily stored scan data is compressed and the compressed scan data is stored in the memory unit 150. In this situation, the main controller 170 desirably changes the storage order between the scan data for the second side of the document P scanned in operation S1040 and the scan data for the first side of the document P re-scanned in operation S1060. If re-scanning of the document P has finished (operation S630, S660), the main controller 170 then determines whether the second document exists (operation S635 or S665).

Figure 11:
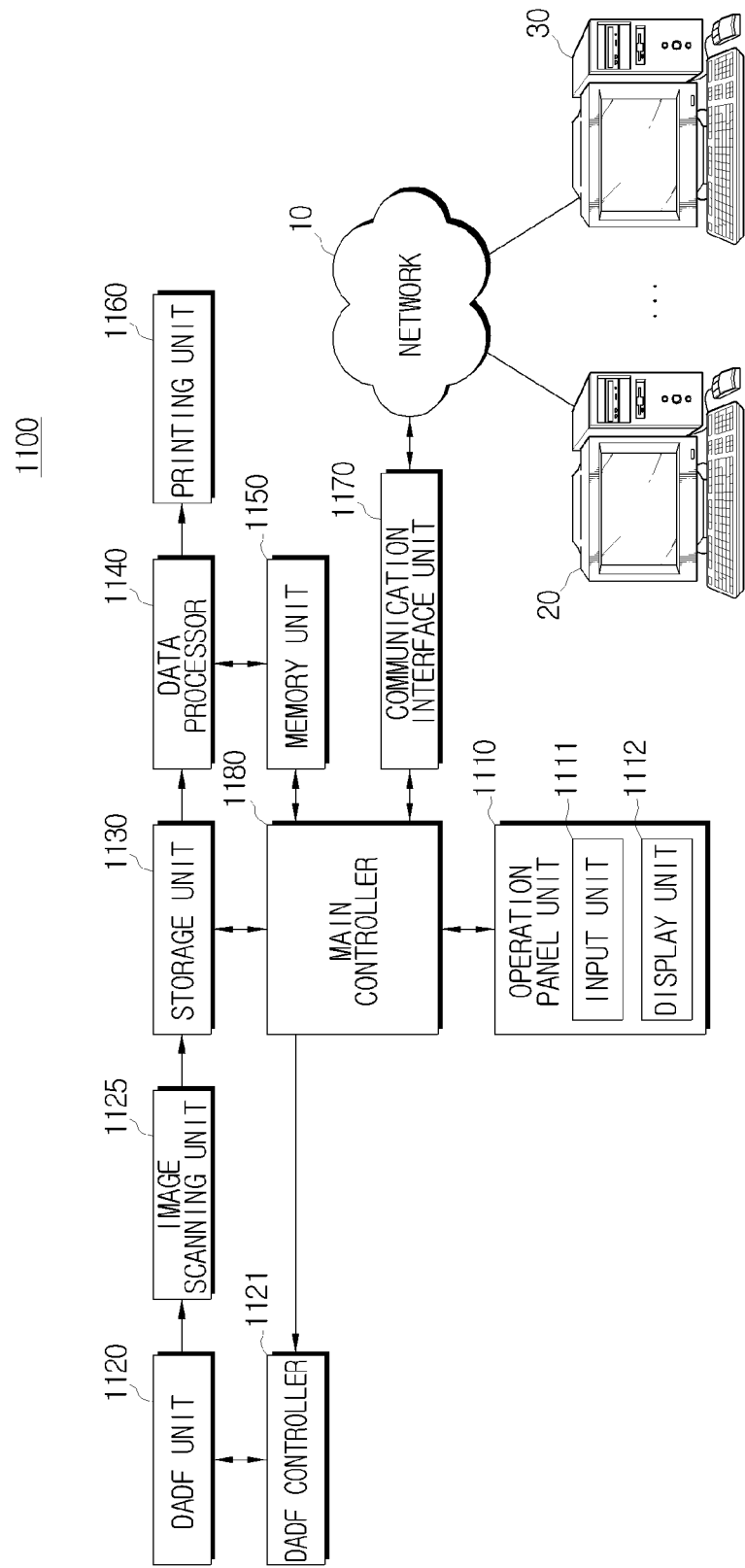
FIG. 11 is a block diagram of an image forming apparatus having a DADF function according to another aspect of the present invention.

FIG. 11 is a block diagram of an image forming apparatus 1100 having a DADF function according to another aspect of the present invention. Referring to FIGS. 1 to 5A, 5B and 11, the image forming apparatus 1100 of FIG. 11 includes an operation panel unit 1110, a DADF unit 1120, a DADF controller 1121, an image scanning unit 1125, a storage unit 1130, a data processor 1140, a memory unit 1150, a printing unit 1160, a communication interface unit 1170 and a main controller 1180.

The operation panel unit 1110, DADF unit 1120, image scanning unit 1125, storage unit 1130, data processor 1140, memory unit 1150 and printing unit 1160 of FIG. 11 are configured in a similar manner to the operation panel unit 110, DADF unit 120, image scanning unit 125, storage unit 130, data processor 140, memory unit 150 and printing unit 160 of FIG. 1, so a detailed description thereof is omitted.

The DADF controller 1121 controls the operation of the DADF unit 1120 in order to reduce loads on the image forming apparatus 1100 when the image forming apparatus 1100 is of a high-end type. For example, if the full memory error occurs, the DADF controller 1121 controls the DADF unit 1120 so that the document P is re-scanned through the duplex path portion D in a mode set from among the first to fourth modes. The DADF controller 1121 is operated similarly to the main controller 170 of FIG. 1, so a detailed description thereof is omitted.

The communication interface unit 1170 supports communication with external hosts 20 and 30 connected via a network 10. If a request of network scanning, network copying and network printing operations is received from one of the external hosts 20 and 30, the communication interface unit 1170 notifies the main controller 1180 that such operations have been requested, and transmits a message stating that the operations have finished to the external hosts 20 and 30 when complete.

If the full memory error is detected, the main controller 1180 controls the DADF controller 1121 so that the document P is re-scanned through the duplex path portion D. The main controller 1180 also controls the DADF controller 1121 to perform the network scanning operation. Additionally, the main controller 1180 supports the same first to fourth modes capable of being activated as in the image forming apparatus 100 of FIG. 1.

If the full memory errors occur while a document is being scanned or copied, the image forming apparatuses 100 and 1100 according to the aspects of the present invention sorts the document and re-scan the sorted document, so that it is possible to reduce the image quality from being degraded. Additionally, although the document is sorted along the duplex path represented as B→C→D→B→C→D→B in FIG. 3 in the aspects of the present invention, the document is fed and sorted in a direction represented as B→C→B in FIG. 3 in a pendular (or back and forth) motion.

In aspects of the present invention, a document also refers to individual sheets of print media, such as, paper.

In various aspects, and/or refers to alternatives chosen from available elements so as to include one or more of the elements. For example, if the elements available include elements X, Y, and Z, and/or refers to X, Y, Z, or any combination thereof.

As described above, according to the aspects of the present invention, when the full memory error occurs during a document scanning operation, the document is sorted using the duplex path, and the previously scanned data is then deleted so that the document is re-scanned. It is thus possible to reduce a decrease in the image quality. In particular, simplex or duplex scanning operations are performed using the DADF function, so it is possible to perform scanning operations at high speeds. Additionally, the document is re-scanned from a page at which the full memory error occurs by the sorting operation, or the document is re-scanned automatically from the position at which the full memory error occurs after being sorted. Accordingly, it is possible to minimize image loss, and to provide a user with clear images. Furthermore, it is possible to reduce the image quality from being degraded without needing to increase the capacity of a buffer in which scan data is temporarily stored, thereby promoting a reduction in cost.

Although a few aspects of the present invention have been shown and described, it would be appreciated by those skilled in the art that changes may be made in this embodiment without departing from the principles and spirit of the invention, the scope of which is defined in the claims and their equivalents.

What is claimed is:

1. An image forming apparatus having a duplex automatic document feeding (DADF) function, comprising:
    a DADF unit to feed a document along a simplex path or a duplex path;
    an image scanning unit to scan the document and output scan data;
    a storage unit to temporarily store the output scan data; and
    a controller to control the DADF unit to sort the document by returning the document along the duplex path at least twice, so as to cause a first side of the document to face the image scanning unit again and re-scan the first side of the document, if a full memory error occurs while the first side of the document is scanned along the simplex path.

2. The image forming apparatus of claim 1, wherein the DADF unit comprises:
    a feeding portion to pick up the document and feed the picked up document;
    the duplex path used to change a feeding path of the document and feed the document back to the image scanning unit so that a second side of the document is scanned; and
    a discharge roller to discharge the document,
    wherein, if the full memory error occurs while the first side of the document is scanned, the duplex path is used to change the feeding path of the document so that the first side of the document is re-scanned by the image scanning unit.

3. The image forming apparatus of claim 1, wherein modes to re-scan the first side of the document comprise a first mode wherein the first side of the document is re-scanned from a page at which the full memory error occurs, a second mode wherein a second document is scanned prior to re-scanning a first document among a plurality of documents, a third mode wherein the first side of the document is re-scanned using a backup, and a fourth mode wherein the second side of the document is scanned prior to re-scanning the first side of the document, wherein the controller causes the first side of the document to be re-scanned in a mode set from among the first to fourth modes based on a selection by a user.

4. The image forming apparatus of claim 3, wherein, if the first mode is set, the DADF unit re-scans the first side of the document using the duplex path.

5. The image forming apparatus of claim 3, wherein, if the second mode is set when there are a plurality of document sheets to be scanned, and if the full memory error occurs while the first side of the first document is scanned, the controller controls the DADF unit to scan the second document while the feeding path of the first document is changed, and to re-scan the first side of the first document.

6. The image forming apparatus of claim 3, further comprising a memory to store the backup to back up the temporarily stored scan data, if the third mode is set,
wherein the controller controls the DADF unit to re-scan the document from a position on the first side of the document at which the full memory error occurs.

7. The image forming apparatus of claim 3, wherein, if the fourth mode is set, the DADF unit scans the second side of the document using the duplex path, and then re-scans the first side of the document.

8. The image forming apparatus of claim 3, further comprising a display unit to display a graphical user interface (GUI) through which the user is able to select at least one from among the first to third modes, if a simplex scan mode of the image forming apparatus is actuated.

9. The image forming apparatus of claim 3, further comprising a display unit to display a GUI through which the user is able to select at least one from among the first to fourth modes, if a duplex scan mode of the image forming apparatus is actuated.

10. A control method of an image forming apparatus, the method comprising:
feeding a document along a simplex path;
scanning the document and outputting scan data;
temporarily storing the output scan data;
if a full memory error occurs while a first side of the document is scanned, sorting the document by returning the document along a duplex path at least twice so as to cause the first side of the document to face an image scanning unit again; and
re-scanning the first side of the sorted document.

11. The method of claim 10, wherein the duplex path comprises a first path along which a picked-up document is fed, a second path whereto a feeding path of the document is changed so that both sides of the document are scanned, and a third path along which the document is discharged,
wherein, if the full memory error occurs, the feeding path of the document is changed using the second path so that the first side of the document is re-scanned.

12. The method of claim 10, wherein the scanning comprises re-scanning the first side of the document in a mode set from among
a first mode wherein the first side of the document is re-scanned from a page at which the full memory error occurs,
a second mode wherein a second document is scanned prior to re-scanning a first document among a plurality of documents,
a third mode wherein the first side of the document is re-scanned using a backup, and
a fourth mode wherein the second side of the document is scanned prior to re-scanning the first side of the document.

13. The method of claim 12, wherein, if the first mode is set, the re-scanning comprises re-scanning the first side of the document using the duplex path.

14. The method of claim 12, wherein, if the second mode is set when there are a plurality of document sheets to be scanned, the re-scanning comprises scanning the second document while the feeding path of the first document is changed using the duplex path, and re-scanning the first side of the first document.

15. The method of claim 12, wherein, if the third mode is set, the re-scanning comprises backing up the scan data and re-scanning the first side of the document from a position on the first side of the document at which the full memory error occurs.

16. The method of claim 12, wherein, if the fourth mode is set, the re-scanning comprises scanning the second side of the document using the duplex path, and then re-scanning the first side of the document.

17. The method of claim 12, further comprising:
if a simplex scan mode of the image forming apparatus is actuated, displaying a graphical user interface (GUI) through which a user is able to select at least one from among the first to third modes; and
if the re-scanning is performed, displaying a message to notify that the document is being re-scanned in a mode selected from among the first to third modes.

18. The method of claim 12, further comprising:
if a duplex scan mode of the image forming apparatus is actuated, displaying a GUI through which a user is able to select at least one from among the first to fourth modes; and
if the re-scanning is performed, displaying a message to notify that the document is being re-scanned in a mode selected from among the first to fourth modes.

19. The method of claim 10, wherein a request for a scanning operation for reading the scan data is received from a plurality of hosts connected to the image forming apparatus via a network.

20. An image forming apparatus able to scan one or both sides of a document via a duplex automatic document feeding (DADF) function, comprising:
a DADF unit having a simplex path to enable scan of a first side of the document and a duplex path to enable scan of the first side and a second side of the document;
an image scanning unit to scan the first side and the second side of the document and output corresponding scan data;
a storage unit to temporarily store some or all of the corresponding scan data; and
a controller to control the DADF unit to transport the document through the duplex path at least twice to face the first side of the document or the second side of the document to the image scanning unit again and to re-scan the respective first side of the document or the second side of the document if a full memory error occurs in the storage unit while the respective first side of the document or the second side of the document is being scanned.

21. The image forming apparatus of claim 20, wherein the controller controls the DADF unit to transport the document through the duplex path one time to face the second side of the document to the image scanning unit after the first side of the document faces the image scanning unit.

22. The image forming apparatus of claim 20, wherein the controller controls the DADF unit to:

re-scan the first side of the document if the full memory error occurs while the first side of the document is being scanned based on a selection of a first mode of the DADF function;

scan a first side of a subsequent document before re-scanning the respective first side of the document or the second side of the document if the full memory error occurs while the respective first side of the document or the second side of the document is being scanned based on a selection of a second mode of the DADF function;

re-scan a portion of the first side of the document that was scanned before the full memory error occurred while storing a portion of the first side of the document that was scanned after the full memory error occurred based on selection of a third mode of the DADF function; or scan the second side of the document prior to re-scanning the first side of the document based on a fourth mode of the DADF function.

23. A method of controlling an image forming apparatus to scan one or both sides of a document via a duplex automatic document feeding (DADF) function via a simplex path to enable scan of a first side of the document and a duplex path to enable scan of the first side and a second side of the document, comprising:

scanning the first side of the document or the second side of the document; and transporting the document through the duplex path more than one time to re-scan the respective first side of the document or the second side of the document if a full memory error occurs in the image forming apparatus while the respective first side of the document or the second side of the document is being scanned.

24. The method of claim 23, further comprising transporting the document through the duplex path one time to scan the second side of the document to the image scanning unit after the first side of the document is scanned.

25. The method of claim 23, further comprising:

re-scanning the first side of the document if the full memory error occurs while the first side of the document is being scanned based on a selection of a first mode of the DADF function;

scanning a first side of a subsequent document before re-scanning the respective first side of the document or the second side of the document if the full memory error occurs while the respective first side of the document or the second side of the document is being scanned based on a selection of a second mode of the DADF function;

re-scanning a portion of the first side of the document that was scanned before the full memory error occurred while storing a portion of the first side of the document that was scanned after the full memory error occurred based on selection of a third mode of the DADF function; or scanning the second side of the document prior to re-scanning the first side of the document based on a fourth mode of the DADF function.

26. An image forming apparatus having a duplex automatic document feeding (DADF) function able to scan one or both sides of a document, comprising:

a DADF unit to perform scanning operations at high speeds and having a simplex operation to scan a first side of the document and a duplex operation to scan the first side and a second side of the document;

an image scanning unit to scan the first side and the second side of the document and output corresponding scan data;

a storage unit to temporarily store some or all of the corresponding scan data; and a controller to control the DADF unit to sort the document by returning the document along the duplex path at least twice, so as to cause the first side of the document to face the image scanning unit again and to re-scan the first side and/or second side of the document if a full memory error occurs in the storage unit while the respective first side of the document or the second side of the document is being scanned.

* * * * *